United States Patent
Miljanic et al.

(10) Patent No.: US 8,559,723 B2
(45) Date of Patent: Oct. 15, 2013

(54) LETTER MODEL AND CHARACTER BIGRAM BASED LANGUAGE MODEL FOR HANDWRITING RECOGNITION

(75) Inventors: Veljko Miljanic, Belgrade (RS); Dave Stevens, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 844 days.

(21) Appl. No.: 12/239,850

(22) Filed: Sep. 29, 2008

(65) Prior Publication Data

US 2010/0080462 A1 Apr. 1, 2010

(51) Int. Cl.
*G06K 9/18* (2006.01)
*G06K 9/34* (2006.01)
*G06K 7/10* (2006.01)

(52) U.S. Cl.
USPC .............................. 382/186; 382/179; 382/321

(58) Field of Classification Search
None
See application file for complete search history.

(56) References Cited

U.S. PATENT DOCUMENTS

| | | | |
|---|---|---|---|
| 5,105,468 A | 4/1992 | Guyon et al. | |
| 5,917,941 A * | 6/1999 | Webb et al. | 382/177 |
| 6,249,605 B1 | 6/2001 | Mao et al. | |
| 6,285,786 B1 | 9/2001 | Seni et al. | |
| 6,393,395 B1 * | 5/2002 | Guha et al. | 704/232 |
| 6,898,315 B2 * | 5/2005 | Guha | 382/187 |
| 7,369,702 B2 | 5/2008 | Abdulkader et al. | |
| 2007/0271087 A1 * | 11/2007 | Slavik et al. | 704/9 |
| 2008/0123940 A1 * | 5/2008 | Kundu et al. | 382/159 |

OTHER PUBLICATIONS

Pittman, James A., "Handwriting Recognition: Tablet PC Text Input", Retrieved at <<http://ieeexplore.ieee.org/iel5/2/4302594/04302613.pdf?tp=&arnumber=4302613&isnumber=4302594&htry=2>>, IEEE Computer Society, Sep. 2007, pp. 49-54.

Schenkel, et al., "On-Line Cursive Script Recognition using Time Delay Neural Networks and Hidden Markov Models", Retrieved at <<http://citeseer.ist.psu.edu/cache/papers/cs/3619/http:zSzzSzwww.isi.ee.ethz.chzSz~schenkelzSzpublicationszSzMVA-paper.pdf/on-line-cursive-script.pdf>>, pp. 1-14.

Beigi, Homayoon S. M., "An Overview of Handwriting Recognition", Retrieved at <<http://www.recognitiontechnologies.com/~beigi/ps/stadc93a.ps>>, pp. 17.

Senior et al., "An Off-Line Cursive Handwriting Recognition System", Retrieved at <<http://ieeexplore.ieee.org/iel4/34/14695/00667887.pdf>>, IEEE Transactions on Pattern Analysis and Machine Intelligence, vol. 20, No. 3, Mar. 1998, pp. 309-321.

Krasnik, Samuel, "On-Line Handwritten Word Recognition", Retrieved at <<http://www.cs.cornell.edu/courses/cs674/2005sp/projects/sam-krasnik.pdf>>, CS674 Natural Language Processing—Spring 2004, pp. 13.

* cited by examiner

*Primary Examiner* — Bhavesh Mehta
*Assistant Examiner* — David F Dunphy (57) ABSTRACT

A handwriting recognition system is described that includes a language model with scoring to improve recognition accuracy, such as for words outside of a selected language model. The handwriting recognition system increases the accuracy of handwriting recognizers that perform segmentation of ink into atomic elements (segments) and then classify each ink segment separately. After segmentation, a shape classifier estimates the class (letter) probabilities for each segment of ink by producing a corresponding score. The system applies the language model scoring to the shape classification results and typically selects the class with the highest score as the recognition result. Because the language model is not too restrictive, it works well for recognizing any word, even those that would not be in a dictionary for the current language. Thus, the handwriting recognition system produces better recognition results and can often recognize words that dictionary-based language models would not recognize correctly.

16 Claims, 8 Drawing Sheets

LETTER MODEL AND CHARACTER BIGRAM BASED LANGUAGE MODEL FOR HANDWRITING RECOGNITION

BACKGROUND

A tablet PC, or pen computer, is a notebook or slate-shaped mobile computer, equipped with a touch screen or graphics tablet/screen hybrid technology that allows the user to operate the computer with a stylus, digital pen, or fingertip instead of a keyboard or mouse. Tablet PCs offer a more natural form of input, as sketching and handwriting are a much more familiar form of input than a keyboard and mouse, especially for people who are new to computers. Tablet PCs can also be more accessible because those who are physically unable to type can utilize the additional features of a tablet PC to be able to interact with the electronic world.

Natural input applications are available that store user handwriting on a tablet PC. Handwriting recognition is the process of receiving and interpreting natural handwritten input, then converting it to input suitable for computer processing. For example, handwriting recognition software may convert handwritten script into characters of the ASCII or Unicode character set. Recognition alternatives are the result of the recognition process. For every ink input, the handwriting recognition software can produce an arbitrary number of recognition alternatives (recognition results).

One challenge in recognizing handwriting is determining where a character ends and a new character begins. Cursive handwriting includes continuous writing of whole words. One common way to recognize individual characters in a word is to segment ink into atomic elements that can be single letters or their parts. A particular letter may be made up of multiple identified segments. A beginning segment is the first ink segment that belongs to a character. Very short characters like the dot have only the beginning segment. A continuation segment includes any ink segment after the first one that forms part of a character. Word breaking is a similar process that distinguishes individual words in a piece of ink. Word breaking is often easier than segmentation because words are generally divided by whitespace.

Due to the nature of handwriting and the variety of handwriting styles, even the best handwriting recognizers cannot accomplish reasonable accuracy without applying some kind of a language model. A language model is a component of handwriting recognition software that scores recognition alternatives based on a set of rules associated with a target language. The purpose of the language model is to increase recognition accuracy by applying language-dependent constraints to the recognition results. Constraints of a language model are designed to suppress recognition alternatives that are impossible or rare in the target language. For example, an English handwriting recognizer may tend to prefer recognizing a two-letter word as "is" rather than "ic" where both are possible recognition results, because "is" is a word in the English language, and "ic" is not.

Some handwriting recognition software uses language models based on dictionaries and sets of rules for combining words from the dictionaries. Although this kind of software does a good job for a set of supported words, it often fails to recognize words that are not in the dictionary. Human handwriting often contains words that are not part of the language model. For example, handwriting may include foreign names, names of companies, foreign cities, and other words that are not in the language model.

Time Delayed Neural Network (TDNN) is classifier that can be used to perform shape classification of the ink segments. A TDNN is a group of neural networks with a special topology that are designed to independently recognize feature units within a larger pattern. Except for the standard set of connections for a current feature unit, TDNNs have connections to input and hidden layers of neighbor feature units.

SUMMARY

A handwriting recognition system is described herein that includes a language model with scoring to improve recognition accuracy, such as for words outside of a selected language model. The handwriting recognition system can be used as the only language model in a handwriting recognition application, or it can be used as a second supplemental language model that complements a primary language model. For example, if the primary language model is dictionary based, then the language model described herein may help to recognize words that are not supported (e.g., not in the dictionary) by the primary language model. The handwriting recognition system increases the accuracy of handwriting recognizers that perform segmentation of ink into atomic elements (segments) and then classify each ink segment separately. Each letter in the word consists of a beginning segment and zero or more continuing ink segments. After segmentation, a shape classifier estimates the class (letter) probabilities for each segment of ink by producing a corresponding score. The system applies the language model scoring to the shape classification results and typically selects the class with the highest score as the recognition result. Because the language model is not too restrictive, it works well for recognizing any word, even those that would not be in a dictionary for the current language. Thus, the handwriting recognition system produces better recognition results and can often recognize words that dictionary-based language models would not recognize correctly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A handwriting recognition system is described herein that includes a language model with scoring to improve recognition accuracy, such as for words outside of a selected language model. The handwriting recognition system can be used as the only language model in a handwriting recognition application, or it can be used as a second supplemental language model that complements a primary language model. For example, if the primary language model is dictionary based, then the language model described herein may help to recognize words that are not supported (e.g., not in the dictionary) by the primary language model. The handwriting recognition system increases the accuracy of handwriting recognizers that perform segmentation of ink into atomic elements (segments) and then classify each ink segment separately. Because of the complexity of cursive handwriting, it is difficult to divide ink into exact letters. Segmentation is used because the system does not initially know where the actual letters are. Ink segmentation attempts to solve this problem by dividing ink into atomic pieces that belong to only one letter. Each letter in the word consists of a beginning segment and zero or more continuing ink segments. After segmentation, a shape classifier estimates the class (letter) probabilities for each segment of ink by producing a corresponding score. The system applies the language model scoring to the shape classification results and evaluates (i.e., scores) recognition alternatives to choose the best one or best N results as the recognition result to provide to the application. The system performs language model scoring on a per segment basis, so it implicitly solves the problem of distinguishing letter boundaries. Because the language model is not too restrictive, it works well for recognizing any word, even those that would not be in a dictionary for the current language. Thus, the handwriting recognition system produces better recognition results and can often recognize words that dictionary-based language models would not recognize correctly. In addition, by applying scoring on an ink segment level, the handwriting recognition system helps to distinguish boundaries of individual letters in a word.

The handwriting recognition system includes a language model that can be classified as a language model with weak constraints. Language-models with weak constraints provide smaller improvements in accuracy but they cover a wider set of recognition alternatives than language models with stronger constraints. Although this model can be used alone, because of weak constraints and the exhaustive search of all recognition alternatives it makes an excellent choice as a complement to more complex and stronger constrained language models. The system may offer recognition results from both the weak constraint language model and a strong constraint language model from which the user can select.

In some embodiments, the handwriting recognition system is added to a Tablet PC handwriting recognition framework as an out of dictionary language model for TDNN based recognition engines. The handwriting recognition system can provide recognition alternatives in cases where the user attempts to write text unsupported by the primary, dictionary-based language model.

Figure 1:
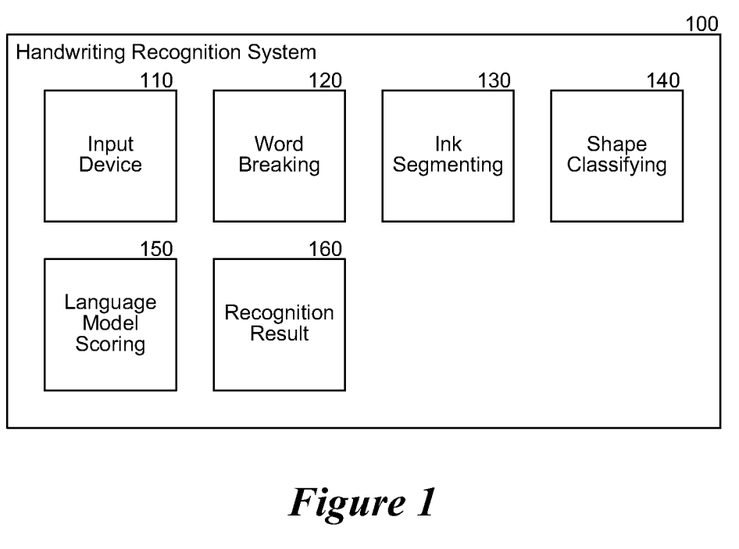
FIG. 1 is a block diagram that illustrates components of the handwriting recognition system, in one embodiment.

FIG. 1 is a block diagram that illustrates components of the handwriting recognition system, in one embodiment. The handwriting recognition system 100 includes an input device 110, a word breaking component 120, an ink segmenting component 130, a shape classifying component 140, a language model scoring component 150, and a recognition result component 160. The handwriting recognition system 100 receives digital ink from the input device and outputs one or more recognition results through the recognition result component 160. Each of these components is described further herein.

The input device 110 receives input from a user and communicates the input as digital ink to an operating system or application. The input device 110 can be a variety of devices such as a stylus, digital pen, mouse, or even the user's finger moving over a touch screen. The input device 110 may provide received input as an array of ink strokes that indicate each time the user set down, moved, and lifted the pen or other writing instrument.

The word-breaking component 120 divides the received digital ink into one or more words. For example, the word-breaking component 120 may identify strokes with a threshold amount of space between them as likely whitespace between words. Alternatively or additionally, the component may use the scoring described herein to determine a probability that a particular blank area represents a separation space between words. In one embodiment, the system 100 invokes a language-independent word breaker that uses a shape classifier that evaluates the probability of space between successive ink strokes.

The ink-segmenting component 130 divides a word into one or more ink segments. An ink segment can represent a single ink stroke, part of a stroke, or several strokes. The ink-segmenting component 130 may use length, distance above and below a line, common shapes, and other information to determine how to divide a word into segments.

The shape-classifying component 140 determines the probability that each ink segment is a part of a particular letter. The shape-classifying component 140 may exhaustively attempt to classify each segment as every available letter and determine which classification is the most probable. The language model scoring component 150 assigns a score (e.g., probability) to each of the recognition alternatives and may factor in other information, such as common bigrams for a selected language to modify the probabilities for each recognition alternative based on classifier score, character bigram probabilities, and number of ink segments that are assigned to each character. This process tends to produce some recognition alternatives that have much higher scores than others, such that the higher scoring recognition alternatives are most likely to be the correct recognition alternatives (e.g., the answer provided to an application). In some embodiments, the shape classifying component 140 uses separate classes for the first (beginning) ink segment in a letter and for other (continuation) ink segments in the letter to better distinguish boundaries between letters.

The recognition result component 160 produces a recognition result for each word. For example, the recognition result component 160 may select the highest scoring shape classification for each segment and produce a recognition result that combines each highest scoring shape classification. The component 160 may also allow the user to select between several of the highest scoring shape classifications to pick a recognition result based on user feedback. The system 100 returns the selected recognition result 160 to the application or other caller that invoked the system 100. If the Viterbi algorithm is used as described herein, then the functionality of the language model scoring component 150 and the recognition result component 160 may be performed at the same time in a single component.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
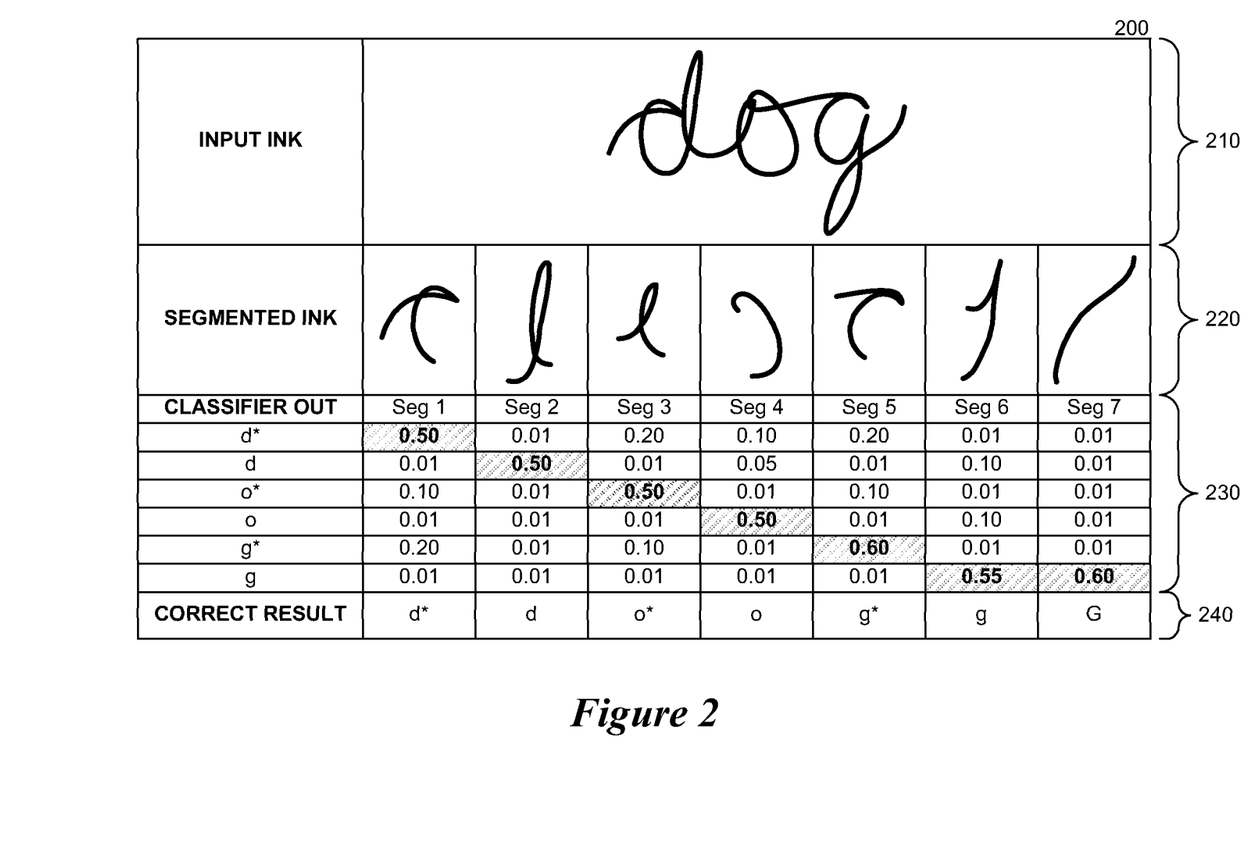
FIG. 2 is a table that illustrates one possible ink segmentation and recognition.

FIG. 2 is a table that illustrates one possible ink segmentation and recognition. Classifier outputs with an asterisk represent possible beginning segments of some character (e.g., d* is the beginning segment of character "d") and contain a score that each ink segment corresponds to the beginning segment of some character. Classifier outputs without an asterisk represent possible continuation segments (e.g., "o" is the continuation segment of character "o") and contain a score that each ink segment corresponds to a continuing segment of some character. The table 200 displays the input ink 210 for the word "dog." The segmented ink area 220 shows the segments identified by the system, which include various ink strokes input by the user. The classification area 230 displays the probabilities that each segment represents a beginning or continuation of a particular letter. Output for letters other than "d," "o," and "g" exist but are omitted to simplify the illustration. The result area 240, shows that the word "dog" is the most likely recognition for the given input ink 210.

Figure 3:
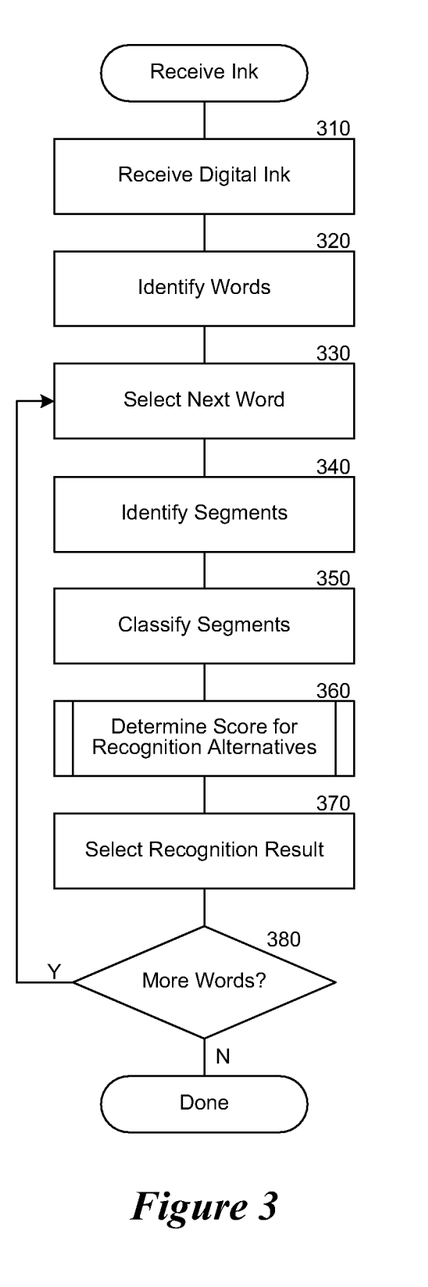
FIG. 3 is a flow diagram that illustrates the processing of the handwriting recognition system to recognize handwriting, in one embodiment.

FIG. 3 is a flow diagram that illustrates the processing of the handwriting recognition system to recognize handwriting, in one embodiment. In block 310, the system receives digital ink based on handwriting received from a user. For example, the user may input digital ink on a Tablet PC into a word processing application that uses the system to recognize handwriting. In block 320, the system identifies words within the received digital ink. For example, the system may use a shape classifier to break the digital ink into individual words. In block 330, the system selects the next identified word (initially the first word). In block 340, the system identifies segments within the selected word that are potential characters or parts of characters. For example, the system may identify various strokes that are commonly part of letters. In block 350, the system classifies each segment to determine letters with which the segment may be associated. For example, the system may create recognition alternatives that evaluate each segment as representing each letter of a target language. In block 360, the system determines a score for each recognition alternative, wherein a greater score indicates a higher probability that the segment represents the recognition alternative associated with the score. For example, the system may determine how likely it is that the segment is part of each letter of the target language. Determining a score is described further herein with reference to FIG. 4. In block 370, the system selects a recognition result for the word based on the determined score. For example, the system may select the classifications have the highest score to derive the recognition result. If the Viterbi algorithm is used as described herein to reduce computational burden, then the system may perform the steps of blocks 360 and 370 at the same time. If the Viterbi algorithm is not used, then block 360 determines the scores for all possible alternatives. In decision block 380, if there are more words then the system loops to block 330 to select the next word, else the system completes. After block 380, these steps conclude.

Figure 4:
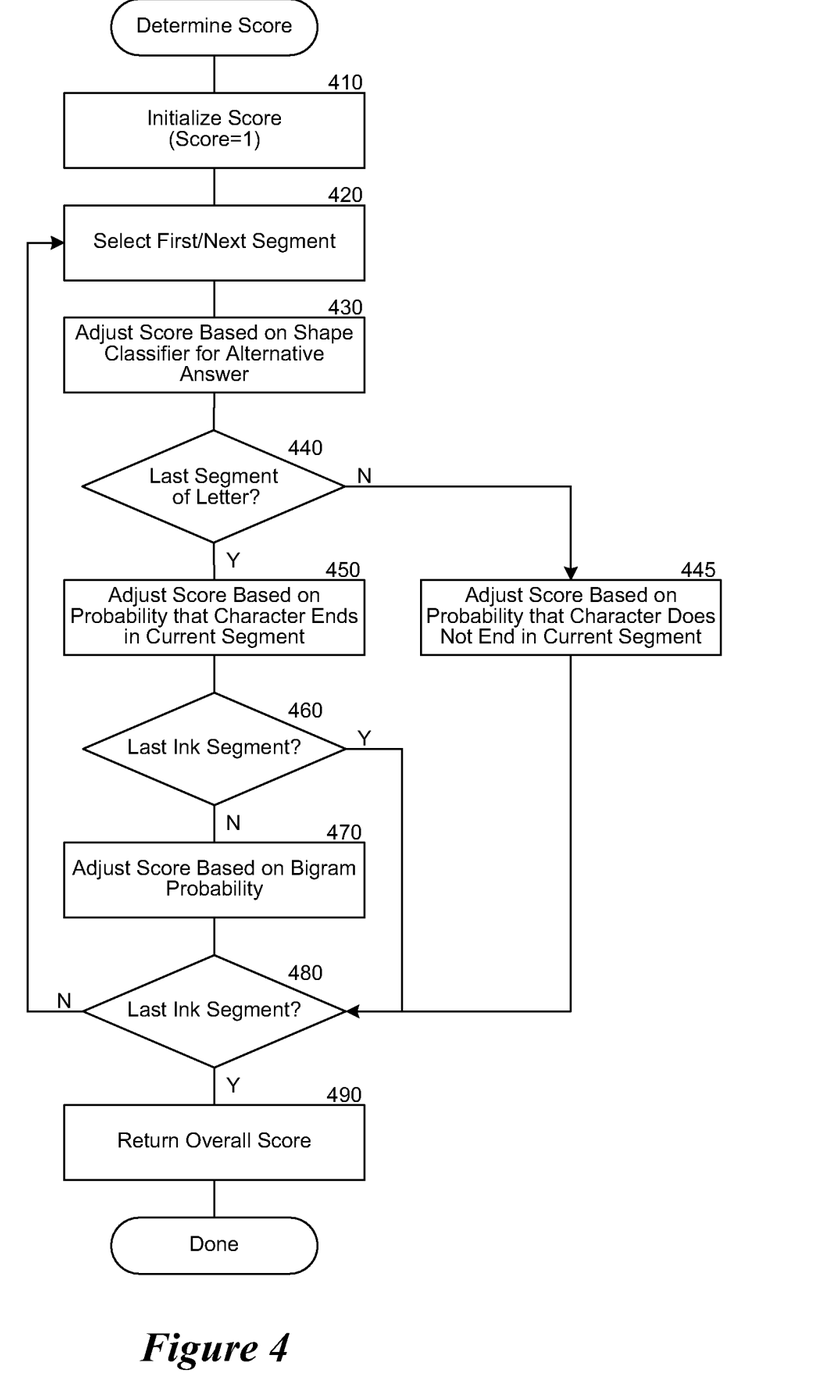
FIG. 4 is a flow diagram that illustrates the processing of the scoring component to determine a score for a recognition alternative, in one embodiment.

FIG. 4 is a flow diagram that illustrates the processing of the scoring component to determine a score for a recognition alternative, in one embodiment. In block 410, the component initializes an overall score for the word. For example, the component may set the score to one initially. In block 420, the component selects the first segment (or the next segment for subsequent iterations of the loop) associated with the word. For example, the segment may be the first of many segments for the word "more." In block 430, the component adjusts the score based on the shape classifier for an alternative answer for the current segment. For example, the component may multiple the initial score by a value less than one that lowers the probability. In decision block 440, if the segment is the last segment of a letter based on the shape classification, then the component continues at block 450, else the component continues at block 445. In block 445, the component adjusts the score based on the probability that the character will not end in the current segment, and then continues at block 480. In block 450, the component adjusts the score based on the probability that the character will end in the current segment. For example, the segment may be the last of three segments in the letter "a." In decision block 460, if the current segment is the last ink segment, then the component jumps to block 480, else the component continues at block 470. In block 470, the component determines the bigram probability between the letter of the current segment and the letter of the next segment. For example, if the current segment is part of the letter "e" and the next segment is part of the letter "r," then the system uses a stored probability for the bigram "er." In decision block 480, if there are more ink segments in the word, then the component loops to block 420 to select the next segment, else the component continues at block 490. In block 490, the component returns the overall score for the word. After block 490, these steps conclude.

In some embodiments, the handwriting recognition system applies character bigram probabilities to modify the scoring and further improve the recognition results. Bigram probabilities account for the fact that certain combinations of letters are common in a particular language, and others are uncommon. For example, the letters "qu," "ing," and "ed" often appear together in the English language. Recognition results containing common bigrams are thus more likely correct than those that do not. Thus, the system promotes alternatives with bigrams that are more likely to occur in the target language.

In some embodiments, the handwriting recognition system applies letter lengths (e.g., as a count of ink segments) to modify the scoring and further improve the recognition results. Letters written in common style have a typical length or range of lengths. This information can help the system to determine when it is likely that the current segment is part of the same letter as the previous n, and when it is not. Thus, the system promotes alternatives with letters written in the common style. In addition, evaluating the letter length helps the system to distinguish successive instances of the same character (e.g., "oo"), which are otherwise difficult.

Scoring Model

Figure 5:
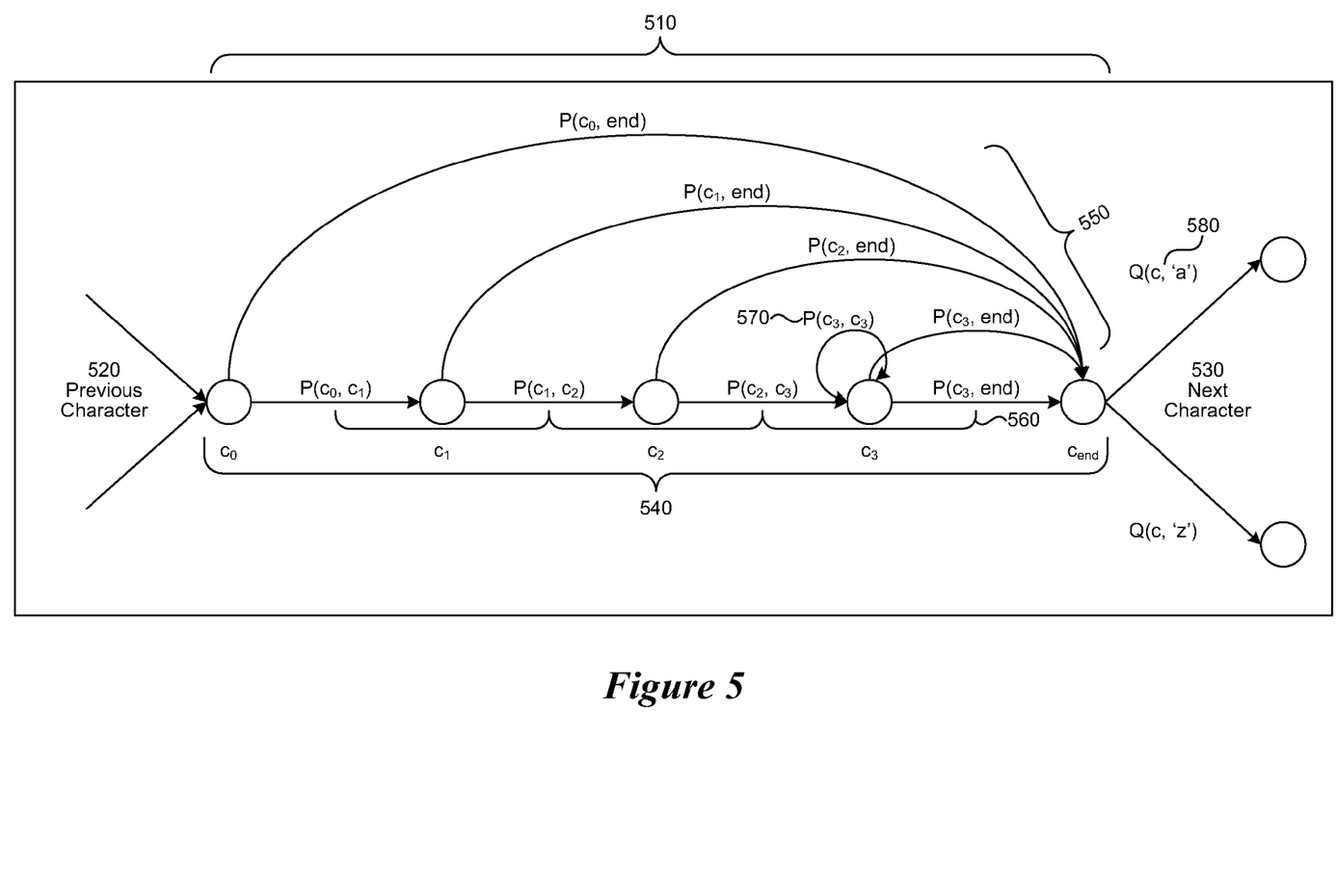
FIG. 5 is a probability diagram that illustrates the scoring of alternatives performed by the language model of the handwriting recognition system, in one embodiment.

FIG. 5 is a probability diagram that illustrates the scoring of alternatives for a suspected character performed by the language model of the handwriting recognition system, in one embodiment. The region 510 represents a suspected character between a previous character 520 and a next character 530. The diagram is a schema for scoring characters of any length, so if a suspected character has a length of three, then the system will use scores $c_0$, $c_1$, $c_2$, $c_{end}$, next character (and corresponding branches between them). The suspected character contains five possible segments 540, labeled $c_0$, $c_1$, $c_2$, $c_3$, and $c_{end}$. The probabilities 550 displayed above each segment represent that the probability that a particular segment is the last segment of the suspected character. For example, the probability $P(c_0, end)$ is the probability that $c_0$ is the last segment in the suspected character. The segment-to-segment character probabilities 560 displayed between each segment represent the probability that a particular segment is a continuing segment of the previous segment. For example, the probability $P(c_1, c_2)$ represents the probability that segment $c_2$ follows segment $c_1$ as part of the suspected character.

The probability 570 is a special probability that the letter sample will exceed a maximum number of segments allowed by the system (e.g., four for the illustrated embodiment). The probabilities 580 between characters represent the bigram probabilities described herein. For example, $Q(c, 'a')$ represents the probability that the letter "a" would follow the suspected character based on historical or dictionary-based bigram probabilities of a particular language. The probabilities of each of the segment nodes ($c_0$, $c_1$, $c_2$, $c_3$) are shape classifier outputs for the observed character on the corresponding ink segment. For example, $P(c_0)$ is the probability of the first segment that is assigned to the character instance in a recognition alternative.

Formula for Calculating Alternative Probability

A recognition alternative is an array with answers for every ink segment (e.g., a guess as to what that ink segment represents). For example, for FIG. 2 the correct recognition alternative would be the array $\{a_0, a_1, a_2, a_3, a_4, a_5, a_6\}$ with elements: $a_0=d_0$; $a_1=d_1$; $a_2=o_0$; $a_3=o_1$; $a_4=g_0$; $a_5=g_1$; $a_6=g_2$; ($d_0$ is the first segment of letter "d," $d_1$ is the second segment of letter "d," and so forth). The handwriting recognition system calculates the probability (i.e., score) of an alternative as:

$$P(\text{alternative}) = P(a_0, 0) * \prod_{j=1}^{\text{last ink segment}} P(a_{j-1} \to a_j) * P(a_j, j) \qquad \text{(Equation 1)}$$

where $P(a_j, j)$ is the probability that the j-th ink segment corresponds to answer $a_j$, $P(a_{j-1} \to a_j)$ is the probability of transition between two successive answer nodes and:

$$P(a_{j-1} \to a_j) = \begin{cases} P(c_{i-1}, c_i) - \text{if } j-1 \text{ and } j \text{ are successive segments} \\ \quad \text{of the same character:nodes } c_{i-1} \text{ and } c_i \\ P(c_i, end) * Q(ch_{k-1}, ch_k) - \text{if } j-1 \text{ is last segment} \\ \quad \text{of char } ch_{k-1} \text{ and } j \text{ is first segment of char } ch_k \\ 0 - \text{for all other transitions} \end{cases}$$

N.B. i represents node indexes in FIG. 5, j is the index of ink segments in the answer, and k is the index of the character.

The following example illustrates how to calculate the score (probability) for the alternative presented in FIG. 2 using the scoring diagram presented in FIG. 5:

$$a_0 = d_0; a_1 = d_1; a_2 = o_0; a_3 = o_1; a_4 = g_0; a_5 = g_1; a_6 = g_2$$

$$P(a_0, a_1, a_2, a_3, a_4, a_5, a_6) = P(a_0, 0) * P(a_0 \to a_1) * P(a_1, 1) *$$
$$P(a_1 \to a_2) * P(a_2, 2) * P(a_2 \to a_3) * P(a_3, 3) * P(a_3 \to a_4) *$$
$$P(a_4, 4) * P(a_4 \to a_5) * P(a_5, 5) * P(a_5 \to a_6) * P(a_6, 6)$$

$$P(d_0, d_1, o_0, o_1, g_0, g_1, g_2) = P(d_0, 0) * P(d_0, d_1) * P(d_1, 1) *$$
$$P(d_1, end) * Q('d', 'o') * P(o_0, 2) * P(o_0, o_1) * P(o_1, 3) * P(o_1, end) *$$
$$Q('o', 'g') * P(g_0, 4) * P(g_0, g_1) * P(g_1, 5) * P(g_1, g_2) * P(g_2, 6)$$

Determining Scoring Model Parameters

The handwriting recognition system uses two types of resources: a character bigram probability table, $Q(x,y)$, and an intra-letter transitions table, $P(c_i, c_{i+1})$, $P(c_i, end)$ (see, e.g., FIG. 5). The system can extract bigram probabilities from balanced corpora. Using a high quality corpora with the system ensures that the system produces good results, as the system will suppress or promote recognition alternatives based on how well the alternatives fit the patterns observed in the corpora. The system calculates intra-letter transition probabilities from a training set. The system performs the following steps on the training set: (1) segment ink, (2) assign correct answer to each segment, and (3) count observed letter segments. After the system has processed all ink samples, the system calculates transition probabilities using the formula:

$$P(c_i, c_{i+1}) = \frac{\text{count}(c_{i+1})}{\text{count}(c_i)}; \qquad \text{(Equation 2)}$$

$$P(c_i, end) = 1 - P(c_i, c_{i+1})$$

where $\text{count}(c_{i+1})$ is the count of character c instances that have i+1-th successive ink segment and $\text{count}(c_i)$ is the count of character c instances that have i-th successive ink segment. The system empirically estimates transition probability for segments that exceed the maximum segment number modeled with letter-model $P(c_{last}, c_{last})$ ($P(c_3, c_3)$ in FIG. 5). For example, the system could use a coefficient of 0.05 for every letter model (this probability should be low since outlier samples are rare by definition).

Identifying Recognition Alternatives

In some embodiments, the goal of the handwriting recognition system is to find the recognition alternative with the highest score obtained using Equation 1 (e.g., see FIG. 4). One way to find the best alternative is to evaluate every possible alternative individually and select the best one. However, such a process can be computationally demanding, and thus may not be an appropriate process for some situations. This approach would take approximately $2T*N^T$ operations (N is total number of nodes in all letter models, T is the number of ink segments).

However, the scoring model described (see e.g., FIG. 5) has properties of a Markov process, so it is possible to find the alternative with the best score using the Viterbi algorithm, which is well understood by those of ordinary skill in the art. The complexity of the Viterbi algorithm is: $T*N^2$, but the handwriting recognition system can achieve even smaller complexity by eliminating transitions that have zero probability. Note that the Viterbi algorithm performs an exhaustive search, which means that the system will not reject any alternative without full evaluation.

Figure 6:
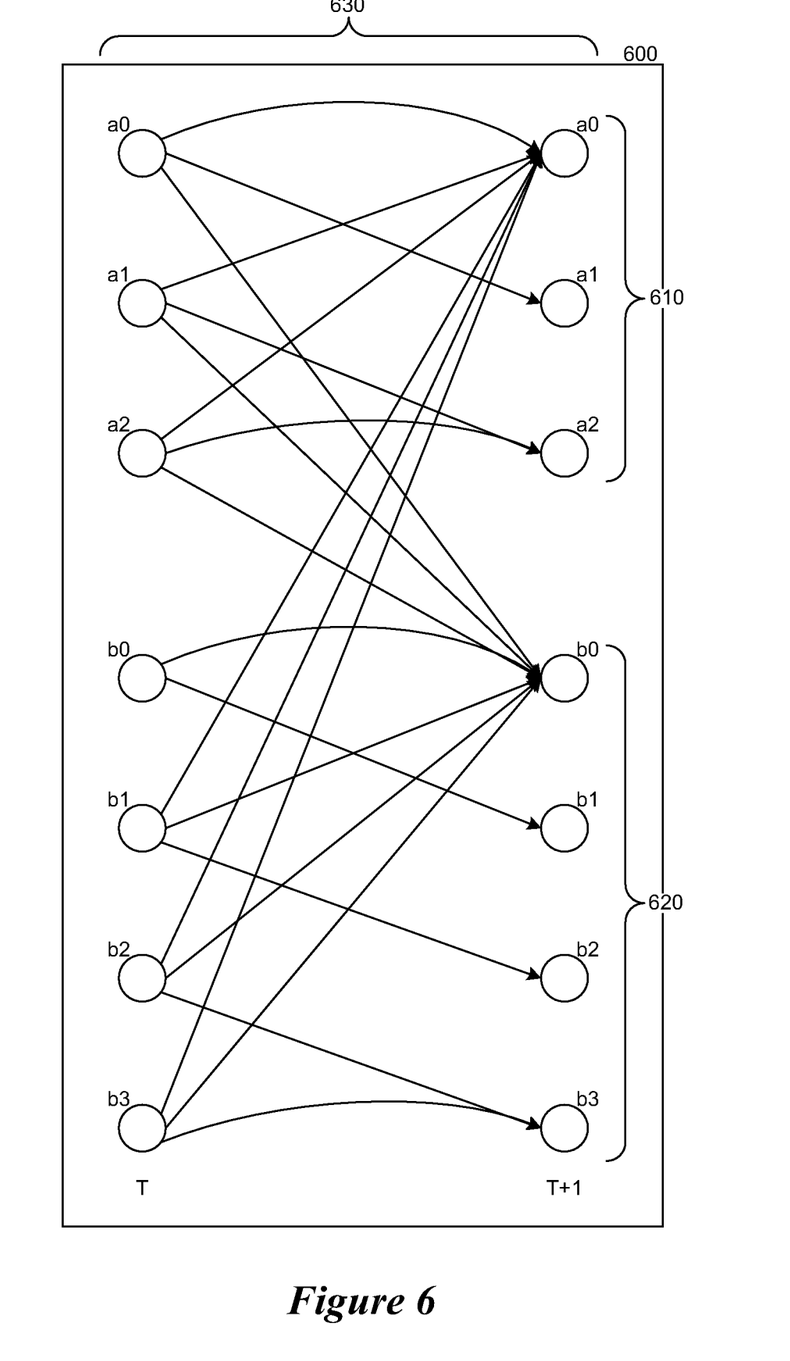
FIG. 6 illustrates a scoring trellis for a two-letter alphabet that includes the letters "a" and "b," in one embodiment.

FIG. 6 illustrates a scoring trellis for a two-letter alphabet that includes the letters "a" and "b," in one embodiment. The trellis 600 represents the two-letter alphabet with each possible connection between neighboring letters. For the letter "a," 610 the trellis 600 models the beginning and up to two continuation nodes and for the letter "b" 620 the trellis 600 models the beginning and up to three continuation nodes. The possible transitions are: (1) from any node to any beginning node, (2) from any node to a successive node of the same letter (if such node exists), and (3) from the last node in the letter model to itself (to cover outlier letter samples that have unusually large numbers of segments).

Columns 630 of nodes labeled as T and T+1 present successive ink segments. If the system splits received ink into M atomic segments, the corresponding trellis will have M columns of nodes. Successive columns will have same set of transition weights (probabilities). The system can find the path with the highest score by applying a standard Viterbi algorithm to the presented trellis 600. As stated before, the system uses the shape classifier outputs to determine probabilities of trellis nodes, and Equation 2 to determine transition probabilities. Then the system applies the Viterbi algorithm to simplify the calculations.

Figure 7:
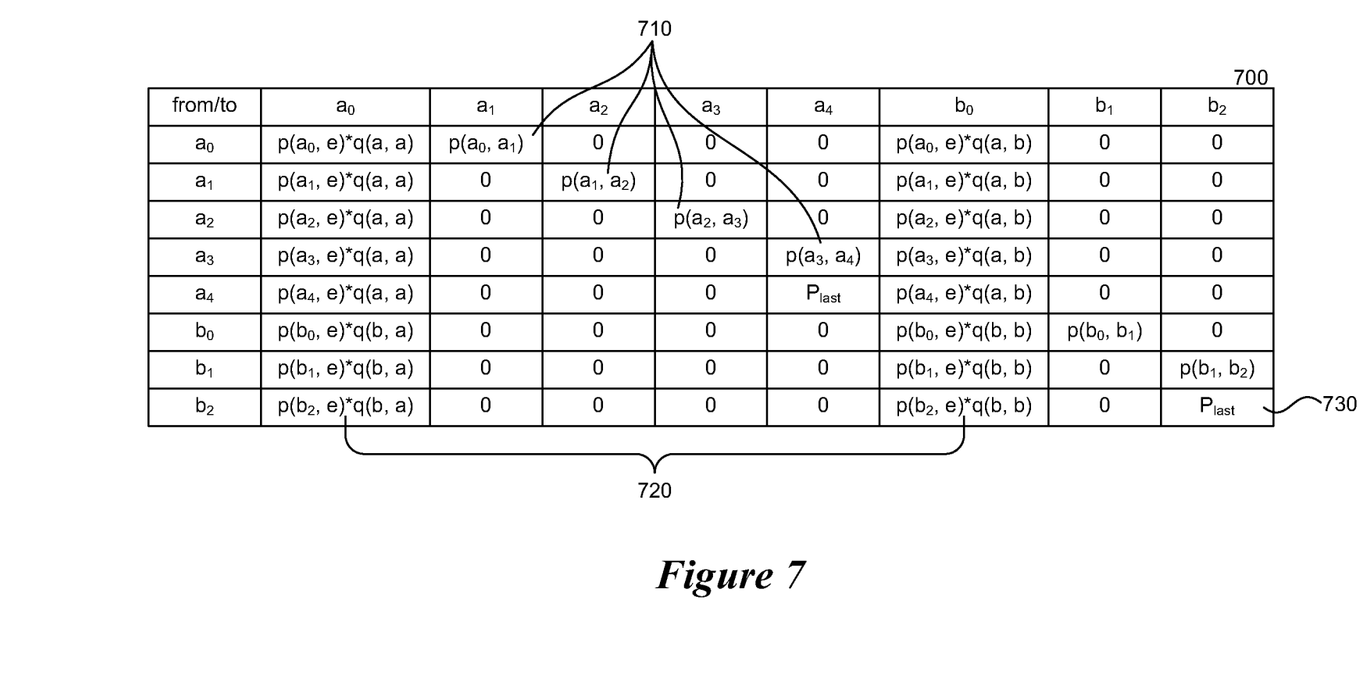
FIG. 7 is a table that illustrates transition probabilities for the scoring trellis presented in FIG. 6.

FIG. 7 is a table that illustrates transition probabilities for the scoring trellis presented in FIG. 6. Equation 2 defines the transition probabilities between successive nodes. The table 700 contains a probability value for each successive letter transition. Probability values 710 that do not contain a letter transition probability (e.g., "q") are intra-letter transition probabilities and probability values 720 with a letter transition probability are character-to-character transitions. The probability value 730 $P_{last}$ is the empirically obtained transition probability that models outlier cases of large letters (corresponds to $P(c_3,c_3)$ in FIG. 5). In one embodiment, the system uses $P_{last}=0.05$.

Since most transition probabilities are zero, one optimization of the Viterbi algorithm is to take into consideration only nonzero transitions. Based on FIG. 7, if the system is evaluating the best transition to the first node of a character (i.e., nodes with index 0), then the system can take into consideration transitions from every node in the trellis. If the system is evaluating the best transition to a continuation node (e.g., 2nd, 3rd, or later node) of a character, then the system can limit consideration to the previous node of that character. If the system is evaluating the best transition to the last modeled node of some character (e.g., $c_3$ in FIG. 5), then the system can limit consideration to transitions from previous nodes and transitions from a reflexive transition (coefficient $P_{last}$ in FIG. 7 or $P(c_3,c_3)$ in FIG. 5).

After the Viterbi search, then the system will have the best alternative as an array of answers for each ink segment. Building the answer string from this alternative is a simple post-processing step that creates a string that consists of characters that correspond to beginning letter nodes in the best alternative.

Figure 8:
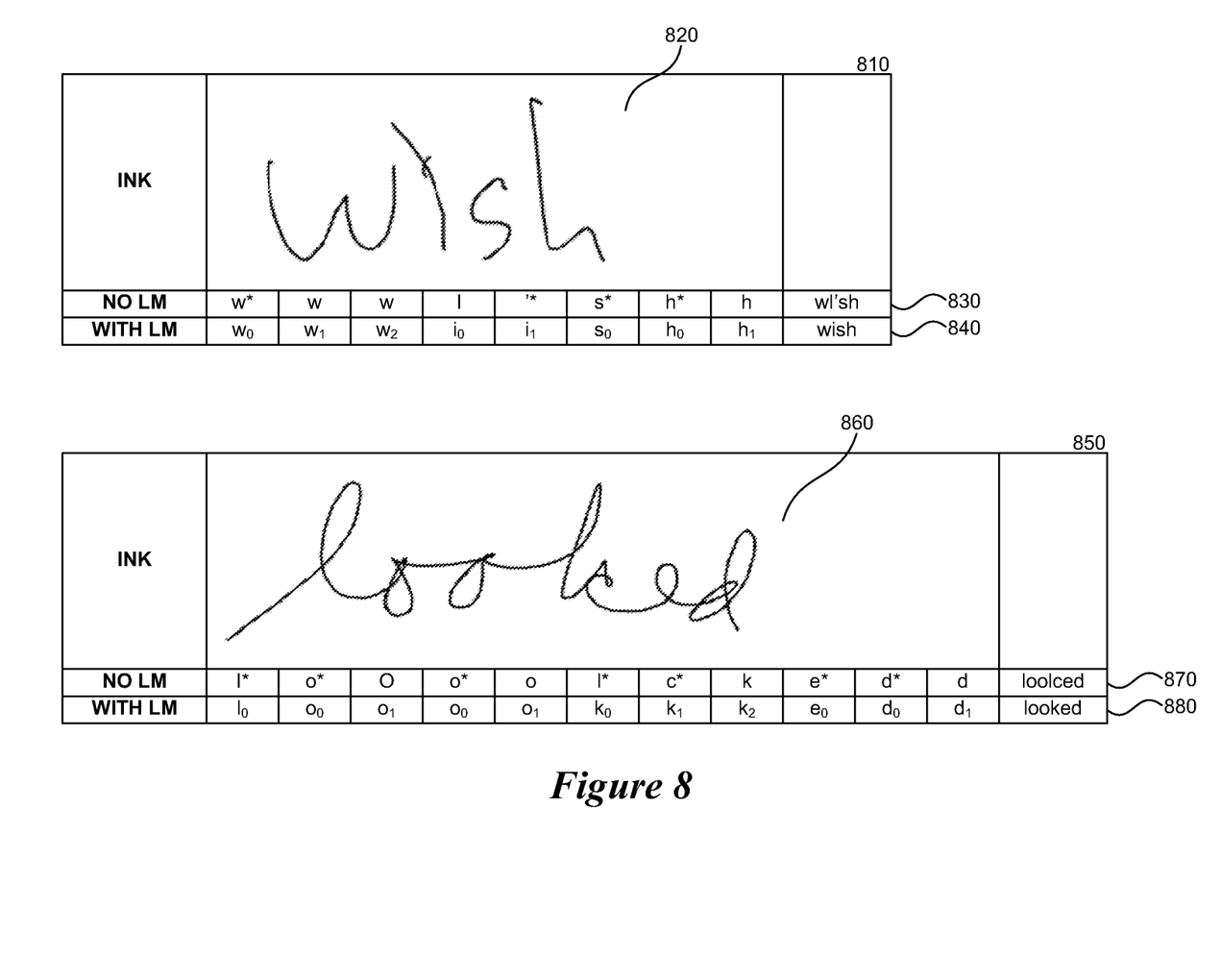
FIG. 8 is a display diagram that illustrates two examples of recognition results produced by the system, in one embodiment.

FIG. 8 is a display diagram that illustrates two examples of recognition results produced by the system, in one embodiment. The first example 810 contains digital ink 820 entered by a user. The row 830 illustrates the recognition result selected without applying the language model described herein, and the row 840 illustrates the recognition result selected after applying the language model described herein. As illustrated the row 840 using the language model described herein selects what is likely the correct result intended by the user. Similarly, the second example 850 contains digital ink 860 entered by a user. The row 870 illustrates the recognition result selected without applying the language model described herein, and the row 880 illustrates the recognition result selected after applying the language model described herein. As illustrated the row 880 using the language model described herein selects what is likely the correct result intended by the user.

From the foregoing, it will be appreciated that specific embodiments of the handwriting recognition system have been described herein for purposes of illustration, but that various modifications may be made without deviating from the spirit and scope of the invention. Accordingly, the invention is not limited except as by the appended claims.

We claim:

1. A computer-implemented method for recognizing user handwriting, the method comprising:
   receiving digital ink based on handwriting received from a user;
   identifying words within the received digital ink;
   for an identified word, identifying segments within the word that are potential characters or parts of characters of the word, the segments having an order, wherein at least some characters are composed of multiple segments;
   applying a classifier to each segment of the word to compute a set of segment probabilities for each segment, each segment having a respective set of probabilities, each segment probability indicating a probability that the segment is a particular part of a particular letter, wherein each set of probabilities for a segment comprises probabilities that the segment corresponds to various parts of various letters according to the shape classifier;
   applying a language model to alternatives to compute scores for the alternatives, respectively, each alternative comprising one probability from each set of probabilities, the probabilities of each alternative ordered according to the order of the segments, the language model computing a score for an alternative according to bigram probabilities corresponding to the letters, the bigram probabilities computed in advance from a corpora, each bigram indicating a probability that two letters occur in succession, each score of an alternative further computed according to probabilities segments in the alternative are successive parts of a same letter, each score of an alternative further computed according to probabilities the segments thereof are end segments of a letter corresponding to the alternative;
   selecting a recognition result for the word based on the determined scores, the recognition result comprising the alternative corresponding to a selected one of the scores.

2. The method of claim 1 wherein the classifier classifies each segment by searching to produce a classification for each possible letter in a language.

3. The method of claim 1 wherein identifying words within the received digital ink comprises invoking a language independent shape classifier that evaluates the probability of space between successive ink strokes.

4. The method of claim 1 wherein determining a score comprises applying the Viterbi algorithm to reduce computational complexity.

5. The method of claim 1 wherein selecting a recognition result comprises selecting the recognition result having a highest score.

6. The method of claim 1 wherein the received digital ink includes at least one word that is not present in the dictionary of words of the currently selected language and wherein selecting the recognition result correctly identifies the word.

7. A computer system for recognizing user handwriting, the system comprising:
- an input device that receives input from a user and communicate the input as digital ink to an application;
- a word breaking component that divides the received digital ink into one or more words;
- an ink segmenting component that divides a word into one or more ink segments;
- a shape classifying component that determines one or more classifications that associate each ink segment as a part of a particular letter;
- a language model scoring component that assigns a probability to each of the classifications, the language model comprising bigram probabilities computed in advance from a corpora, each bigram probability indicating a probability that two letters occur in succession, the scoring component computing a score according to bigram probabilities corresponding to letters identified by the classifying component, each score further computed according to probabilities segments are successive parts of a same letter, each score further computed according to probabilities the segments are end segments of a letter identifying by the shape classifying component;
- a recognition result component configured to produce a recognition result for each word based on scores computed by the language model.

8. The system of claim 7 wherein the input device is selected from the group consisting of a stylus, a digital pen, a mouse, and a user's finger moving over a touch screen.

9. The system of claim 7 wherein the input device is further configured to provide received input as an array of ink strokes.

10. The system of claim 7 wherein the word breaking component identifies ink strokes based on detecting a threshold amount of space between strokes.

11. The system of claim 7 wherein the shape classifying component exhaustively attempts to classify each segment as every available letter in a target language and determine which classification is the most probable.

12. The system of claim 7 wherein the shape classifying component uses separate classes for the first ink segment in a letter and for continuation ink segments in the letter to better distinguish boundaries between letters.

13. A computer-readable storage device encoded with instructions for controlling a computer system to determine a score for a recognition alternative, by a method comprising:
- receiving a digital ink segment that makes up part of a word;
- adjusting a score based on output of a shape classifier for a recognition alternative of the digital ink segment;
- if the digital ink segment is the last segment in a letter, adjusting the score based on the probability that the letter ends in the digital ink segment;
- if there are more ink segments in the word, adjusting the score based on a bigram probability between the letter and a subsequent letter, the bigram probability selected according to the letter and the subsequent letter from among a set of bigram probabilities computed in advance from a corpora, wherein each bigram probability indicating a probability that two letters appear in succession in a word; and
- if the digital ink segment is the last segment in the word, providing the score for the recognition alternative by applying a weak-constrained language model that recognizes words not present in a dictionary of words of a currently selected language, the weak-constrained language model comprising probabilities that segments are last segments of letters.

14. The device of claim 13 wherein the method comprises a language model that exhaustively considers each possible letter in a target language.

15. The device of claim 13 wherein the method avoids at least one calculation using the Viterbi algorithm.

16. The device of claim 13 wherein the provided score indicates the likelihood that the recognition alternative is the correct answer for the word.

* * * * *